United States Patent
Davidson

[15] 3,669,002
[45] June 13, 1972

[54] DEVICE FOR HEATING FRANKFURTERS AND THE LIKE

[72] Inventor: Brian Y. Davidson, 34 Pineway Boulevard, Willowdale, Ontario, Canada

[22] Filed: May 22, 1970
[21] Appl. No.: 39,734

[52] U.S. Cl. ..................................99/327, 99/339, 99/393, 99/400, 99/427, 99/441, 219/538
[51] Int. Cl. ......................................................A47j 27/62
[58] Field of Search..................99/326, 327, 328, 329, 339, 99/440, 441, 400, 334, 335, 336, 427, 443, 446; 219/538

[56] References Cited

UNITED STATES PATENTS

| | | | |
|---|---|---|---|
| 1,996,297 | 4/1935 | Langenfeld | 99/441 X |
| 2,329,937 | 9/1943 | Orkfritz | 99/335 |
| 3,065,688 | 11/1962 | Lindemann | 99/440 X |
| 3,289,570 | 12/1966 | Smith | 99/335 |

*Primary Examiner*—Billy J. Wilhite
*Attorney*—Rogers, Bereskin & Parr

[57] ABSTRACT

A device for heating a frankfurter and ejecting the frankfurter when it is ready to be served. The frankfurter is located in a desired orientation and heated by at least one electric heating element. An ejector mechanism is coupled to a control lever so that once the frankfurter has been heated, the control lever may be moved to eject the frankfurter. A timer can be incorporated in the device to activate the ejector automatically when a predetermined time interval has elapsed. The timer also switches off the electrical heating element when the frankfurter has been heated.

2 Claims, 8 Drawing Figures

3,669,002

PATENTED JUN 13 1972

INVENTOR.
BRIAN Y. DAVIDSON

BY
Rogers, Bereskin, & Parr

DEVICE FOR HEATING FRANKFURTERS AND THE LIKE

This invention relates to a device for heating frankfurters or the like automatically.

Smoked sausages of beef or of beef and pork are often used to make sandwiches. The sausages are commonly called frankfurters or wieners and are sold ready for heating by our convenient method. In the home, the frankfurter is heated either in hot water or it is grilled under a heating element in a stove or the like.

It is preferably to heat the frankfurter relatively quickly to seal the skin and contain the juices inside the skin while the rest of the frankfurter is heated. When the frankfurter is placed in boiling water, the temperature is not sufficient to seal the skin and the juices tend to permeate the skin during heating, with consequent deterioration of the taste of the frankfurter. However, while grilling is considered preferable to heating the frankfurter in water, the frankfurter must be moved periodically to ensure that it is heated evenly. If it is simply left in the grill, there is a tendency for the upper portion of the frankfurter to burn while the underside is not heated adequately.

Another popular method of heating frankfurters is to place them on a barbecue where the heat from a charcoal fire heats the frankfurter. The frankfurter is heated quite quickly to retain the juices in the frankfurter. However the barbeque requires considerable preparation and is therefore not suitable for preparing a snack quickly.

It is one of the objects of the present invention to provide a device which heats a frankfurter quickly and conveniently in an improved manner, and from which the frankfurter can be easily removed when it is heated and ready for serving.

Accordingly, in a particular preferred embodiment of the present invention, a device is provided for heating a frankfurter and ejecting the frankfurter when it is ready to be served. The frankfurter is located in a desired orientation between two electric heating elements which are controlled by a timer. An ejector mechanism is coupled to the timer so that once the frankfurter has been in the device for a predetermined time the timer switches the device off and the frankfurter is partially ejected to indicate that it is ready to be removed from the device.

The invention will be better understood with reference to the drawings, wherein.

Figure 1:
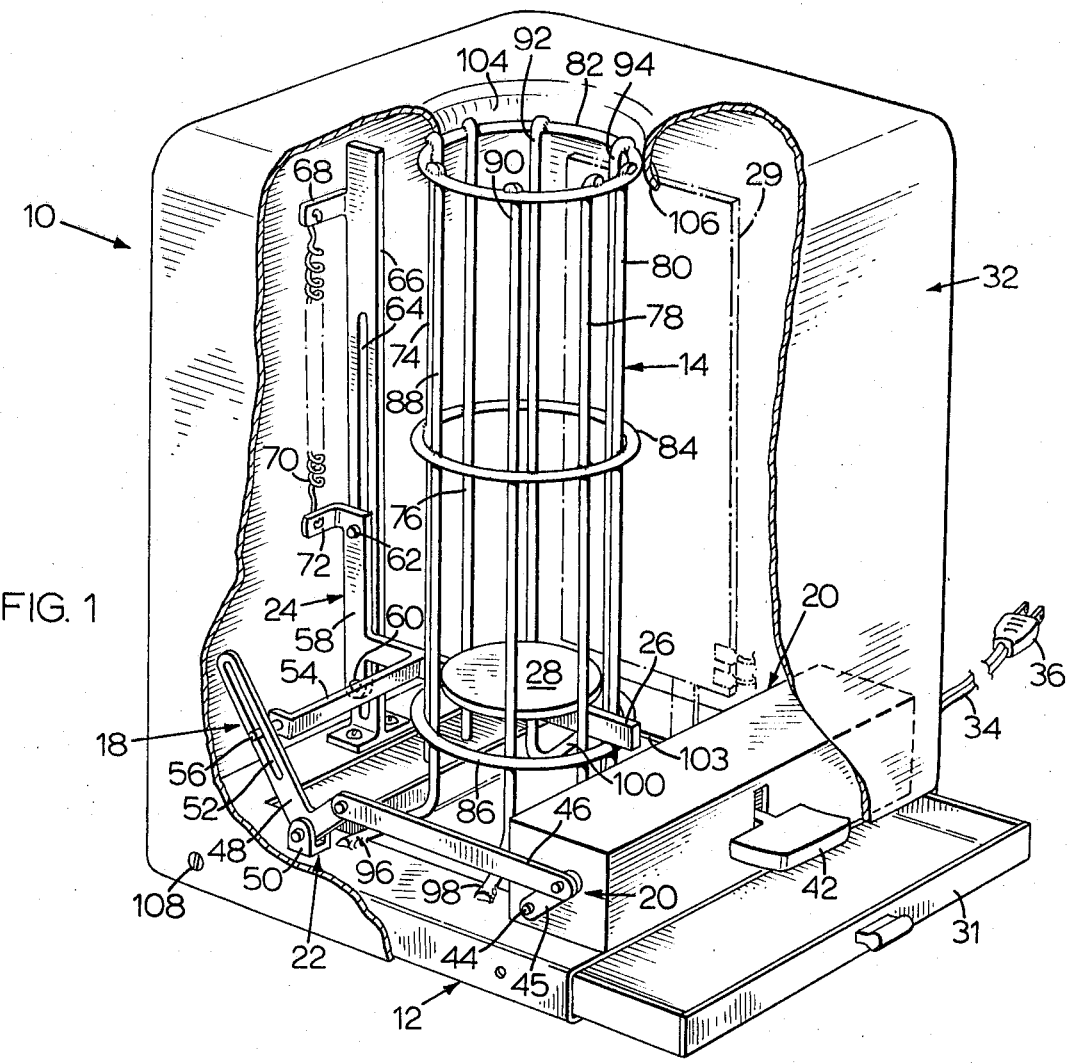
FIG. 1 is a partially sectioned perspective view of a device according to the invention.
Figure 2:
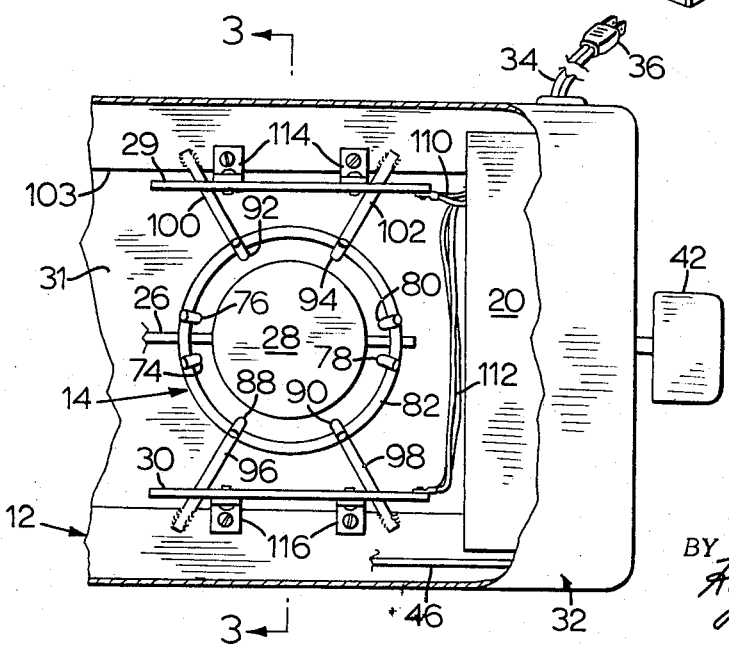
FIG. 2 is a partially sectioned plan view of a portion of the device.
Figure 3:
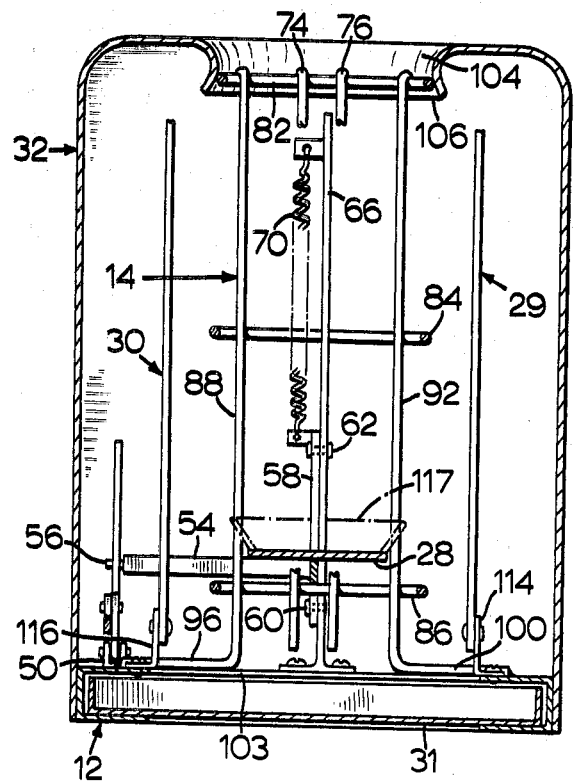
FIG. 3 is a sectional view on lines 3—3 of FIG. 2.

Reference is first made to FIGS. 1 to 3 with particular reference to FIG. 1. A device 10 for heating frankfurters or other similarly shaped food products has a chassis 12 on which is supported an upright generally tubular framework 14 for receiving a frankfurter. An ejector mechanism 18 is attached to the chassis 12 and includes a timer 20 which is coupled by a linkage 22 to an elevator 24. The elevator includes a support bar 26 which extends through a lower part of the framework 14 and has a circular plate 28 attached to its upper surface for supporting the frankfurter. The chassis also supports a pair of electrical elements 29, 30, (one of which is shown in chain-dotted outline in FIG. 1) which are disposed in spaced-apart parallel relation about the framework 14 for heating the frankfurter. A removable tray 31 is slidably mounted in the chassis 12 below the framework 14 to collect particles of food and any grease or juices which may fall from the frankfurter during heating. The tray has an inclined floor so that the grease and juices tend to flow toward the front of the tray and to a cooler area under the timer 20. The chassis 12 is covered by an external casing 32 which fits over the chassis. An electrical conductor 34 and plug 36 are provided for connecting the device to an electrical outlet.

The heating elements 29, 30 are controlled by the timer 20 upon depressing a control lever 42 which extends through the casing 32 above tray 31. A control rod 44 projects from a side of the timer 20 and has a crank 45 fixed to it.

Link 46 is pivotally connected to the crank 45, the other end of the link 46 being pivotally connected to a first end of a bell crank lever 48. The lever 48 is pivotally mounted in a U-shaped bracket 50 on the chassis 12 and extends upwardly from the bracket 50 towards a second end which contains an elongated inclined slot 52. The support bar 26 is rigidly attached intermediate its length to an end of a horizontal extension bar 54 which has a roller or pin 56 at its distal end for sliding in the slot 52. The support bar 26 terminates at its end remote from the framework 14 in an upright portion 58 which has a pair of horizontal rollers 60, 62 engaged in a vertical elongated slot 64 in a vertical guide 66. The guide 66 is attached by its lower end to the chassis 12 and has an upper hook portion 68 which supports an upper end of a spring 70. The lower end of the spring is attached to a lug 72 on the upright portion 58 of the support bar 26 to maintain the spring 70 in tension.

When the control rod 44 is rotated by moving the lever 42 downwardly, the crank 45, link 46 and bell crank lever 48 cooperate to move the support bar 26 vertically downwards, because the pin 56 is made to slide in the inclined slot 52. A latch (not shown) in the timer retains the ejector mechanism 18 in this first or lower position (as drawn) until a predetermined time interval elapses. This interval is determined by the size of frankfurter being heated and by the electrical current drawn by the elements 29, 30 to heat the frankfurters. For a 6 inch frankfurter having a diameter of between three-fourths inch and seven-eighths inch the time interval will be typically 2 minutes. After heating, the timer releases the latch and the spring 70 elevates the support bar 26 into a second or upper position where a part of the frankfurter projects above the casing 32 to indicate that the frankfurter is ready to be removed.

The support bar 26 is located generally on a diameter of the framework 14 and is guided to move vertically between two pairs of upright rods 74, 76 and 78, 80 which form part of the upright framework 14. A further two pairs of rods 88, 90 and 92, 94 and upper, intermediate and lower hoops 82, 84 and 86 complete the framework 14. Each of the rods is attached to respective inner surface of the three hoops and has a short curved upper portion which curls over the upper hoop 82 to permit smooth access for a frankfurter. The rods 88, 90 and 92, 94 have respective radially extending feet 96, 98 and 100, 102. Each foot is attached on its underside to an upper face of the chassis 12 to support the framework 14 above an opening 103 in the chassis. The opening permits grease or other waste to fall from the hot frankfurter into the relatively cool tray 31.

The casing 32 covers the ejector mechanism 18, chassis 12 and upright framework 14 and has an upper opening 104 in its top surface for providing access to place a frankfurter in the framework 14. The opening is defined by a skirt 106 which extends downwardly and radially outwards towards its lower edge for locating on the upper hoop 82 to position casing 32 on the framework 14. Four fasteners 108 (one of which is shown) are provided for retaining the casing 32 on the chassis 12. When the support bar 26 is in its lower position the frankfurter is below the skirt 106 to ensure substantially uniform heating of the frankfurter.

Reference is next made to FIGS. 2 and 3 with particular reference to FIG. 2 to describe the location of the heating elements 29, 30 on the chassis 12. The elements are of a conventional form and consists of a heating wire wrapped about an insulator and connected by conductors 110 and 112 to the timer 20. The elements 29, 30 are respectively mounted by angle brackets 114, 116 to the chassis 12, and are spaced from the framework 14 and casing 32 to reduce the risk of the element coming into contact with other metallic parts of the device. Preferably, the heating elements 29, 30 are provided with heating coils on one side only so that heat is applied towards the framework 14 rather than towards the casing 32.

In use, a frankfurter is placed in the upright framework 14 with its lower end supported by the plate 28 on the support bar 26. The control lever 42 is then depressed to lower the support bar 26 into the lower position as shown in FIG. 1 and to similtaneously actuate an electric switch for energizing the heating elements 29, 30. As soon as the timing cycle is completed, the timer simultaneously switches off the elements 29, 30 and releases the linkage 22 and elevator 24 to permit the spring 70 to move the support bar 26 and the frankfurter upwardly. A portion of the frankfurter then projects above the casing 32 to indicate that the frankfurter is ready to be removed. The user can then remove the frankfurter using a fork or tongs.

The framework 14 may be of any suitable form which will both guide the frankfurter as the support bar 26 moves between its lower and upper positions and permit heat from the elements 29, 30 to heat the frankfurter. However, the framework will function as a guide only if sufficient rods are provided to prevent the frankfurter from curling and jamming against the hoops. On the other hand for quicker heating it is preferable to have as few rods as possible. Consequently the framework is designed as a compromise to provide a smooth guide for the frankfurter even if it tends to curl and yet to permit relatively fast heating of the frankfurter. Any framework which satisfies these requirements may be used in place of the framework described. Ejector mechanism 18 may also take many forms but is should cooperate with the timer 20 to eject the frankfurter when heating is finished to indicate that the frankfurter is ready to be removed from the device.

For small diameter frankfurters, it may be necessary to provide more positive support at the plate 28 to ensure that the lower end of the frankfurter does not stray between adjacent rods in the framework 14. A suitable lip 117 for plate 28 is indicated in dotted outline in FIG. 3. The lip extends upwardly from the periphery of the plate to prevent sideways movement of the lower end of the frankfurter. The the rods and hoops in the framework 14 will become hot as the frankfurter is heating and will tend to burn the skin of the frankfurter. Burns of this kind are commonly associated with barbecued frankfurters which, because they are heated quickly to seal the juices, are often more acceptable than grilled or water-heated frankfurters. If preferred, the framework 14 can be modified by adding additional rods or hoops which will burn a particular pattern on the frankfurter to further identify the frankfurter as one which was heated relatively quickly in the device 10 and which tastes somewhat like a barbecued frankfurter.

Figure 4:
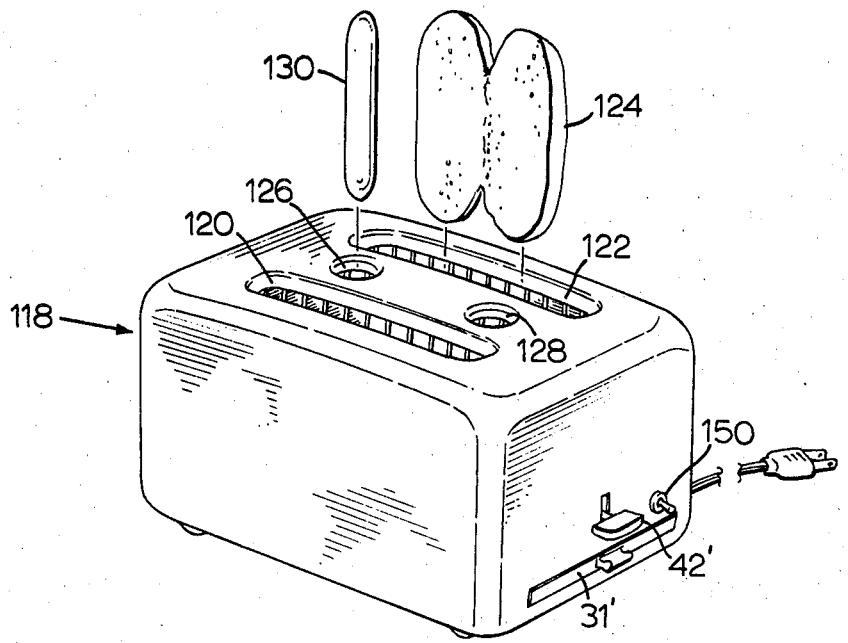
FIG. 4 is a perspective view of another embodiment of the invention.

Reference is next made to FIG. 4 which shows a device 118 capable of toasting two buns and heating two frankfurters simultaneously. The device 118 has a pair of elongated slots 120, 122, each adapted to receive a bun 124, and two circular openings 126, 128 between the slots 120, 122, each circular opening being adapted to receive a frankfurter 130.

Figure 5:
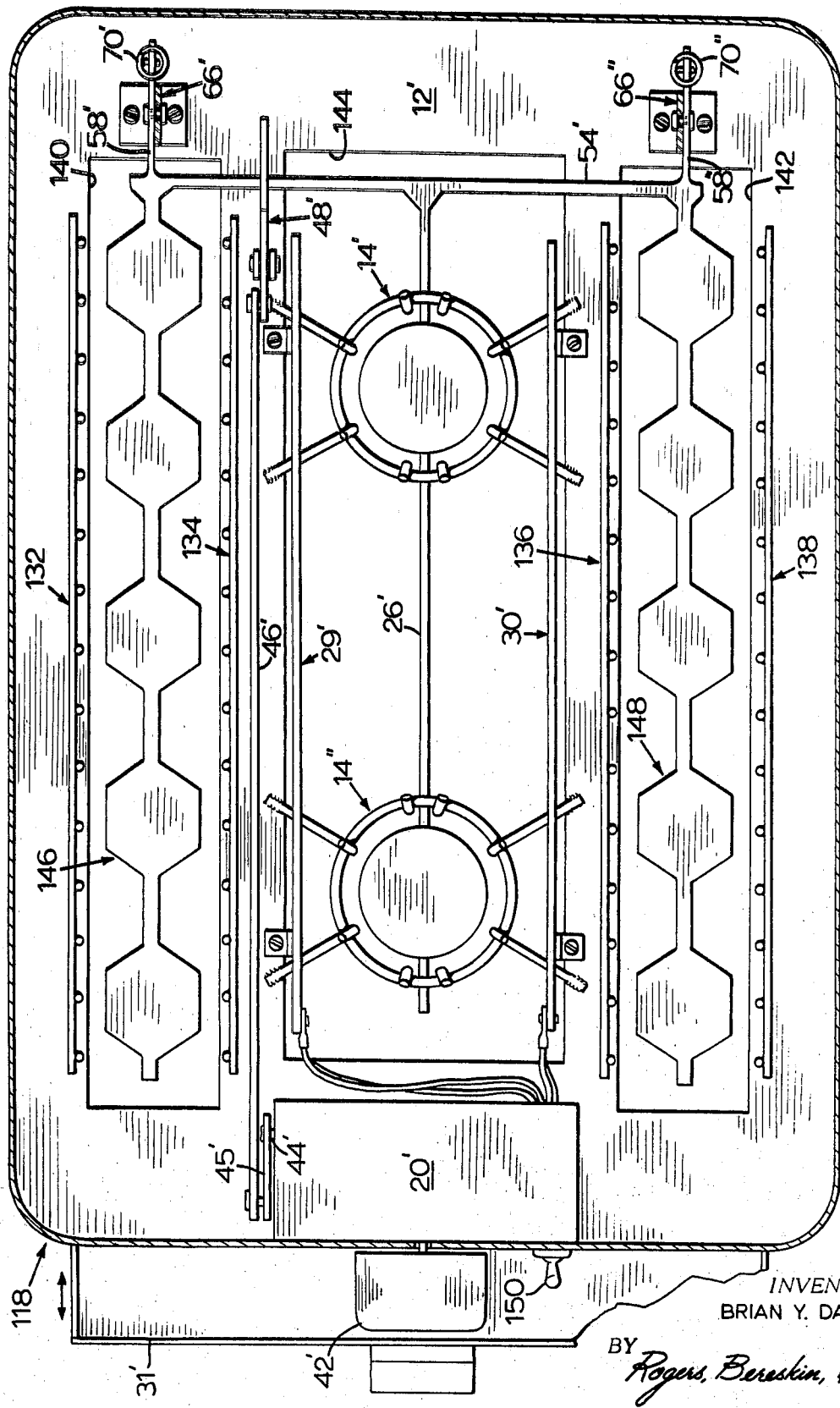
FIG. 5 is a plan view of the device shown in FIG. 4 with the cover removed.

Reference is next made to FIG. 5 to more fully describe the device 118. Parts similar to those described with reference to FIGS. 1, 2 and 3 are given primed numerals in their first occurrence and double primed numerals in their second occurrence. The device 118 has two upright frameworks 14' and 14" coupled to a common support bar 26'. The support bar is attached to a transversely extending extension bar 54' which is coupled to a bell crank lever 48'. A link 46' and a crank 45' transmit motion from a control rod 44' on a timer 20' to the bell crank lever 48'.

A pair of spaced-apart parallel heating elements 29', 30', are provided for heating the frankfurters 130 and for toasting the buns 124 (FIG. 4) contemporaneously. The buns are supported between pairs of generally flat grids 132, 134 and 136, 138. These grids project upwardly from opposed sides of elongated openings 140, 142 in a chassis 12' which permit crumbs and the like to fall through into a tray 31'. A similar opening 144 is provided under the upright frameworks 14' and 14" to permit fat and the like to fall into the tray 31'.

Each of the ends extension the extension bar 54' is connected to a respective one of a pair of carrier plates 146, 148 for supporting the buns 124 (FIG. 4). Because of the weight of two frankfurters and two buns, the device 118 has two vertical guides 66' and 66" coupled to two springs 70' and 70". However, one spring can be used if preferred, although two springs will tend to give a smoother action. The springs are attached to upright portions 58' and 58" which extend from the respective ends of the extension bar 54'.

A control lever 42' is provided for lowering frankfurters and buns similtaneously and actuating the timer 20'. Once the timing cycle is completed, the timer operates the control rod 42' and elevates both the frankfurters and buns to indicate that they are ready to be eaten.

If desired, a switch 150 can be provided which is connected electrically within the timer 20' for changing the voltage applied to the elements 29', 30'. When the timer is activated to heat the frankfurter and the buns, a relatively low voltage is applied to the elements 29', 130'. However when it is desired to clean the device, the switch 150 is moved and full line voltage is applied to the elements to provide an intense heat which burns off or melts the fat which may have accumulated on parts of the device. Preferably the switch 150 is coupled to the timer 20' so that the switch 150 can only be actuated to supply full line voltage if the support bar 26' and carrier plates 146, 148 are in the raised position. As soon as a user pushes the lever 42'downwards, he activates a mechanical interlock which moves switch 150 to again apply a lower voltage to the heating elements 29', 30'. Thus if a user places a frankfurter or bun in the device during cleaning, as soon as he presses the lever 42' to cook the frankfurter he will automatically disconnect line voltage from elements 29', 30' to reduce the heat applied to the frankfurter. Normally the switch 150 will not be needed, because it is found that most of the fat tending to accumulate on the framework 14', 14" will burn off as the frankfurter is being heated, at the same time improving the flavor of the frankfurter.

Figure 6:
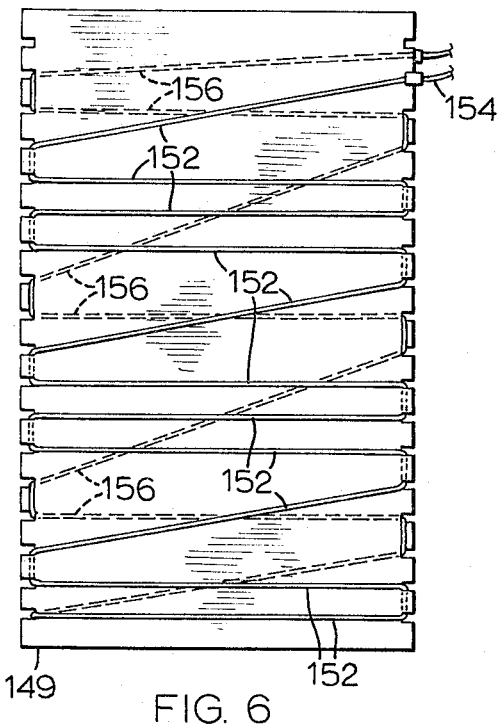
FIG. 6 is a front view of a heating element.

The elements 29', 30' in the device 118 can be positioned relative to the frameworks 14', 14" and grids 134, 136 such that they provide greater heat at the upright frameworks 14' and 14" for heating the frankfurters than they provide for heating the buns. Alternatively, the elements 29', 30' can be wound in such a way that they provide greater heat on one side than on the other. Such an element is shown in FIG. 6 and includes an insulating sheet 149 on which the heating wires are wound. The side shown of the insulator 149 is the side which faces the frameworks 14' and 14". Parts 152 of a heating wire 154 on this side of the element are shown in full outline and parts 156 on the other side are shown in dotted outline. It will be seen that the heating wire has 11 portions exposed on the side shown, and 7 exposed on the opposite side (shown in dotted outline). Thus the heat available from the front side (as drawn) will be approximately 50 percent greater than that available on the opposite side. Various windings are possible to vary this relationship. Thus a combination of windings and positioning of the elements will dictate the relationship of the amount of heat applied to the frankfurters relative to the heat applied to the buns.

Figure 7:
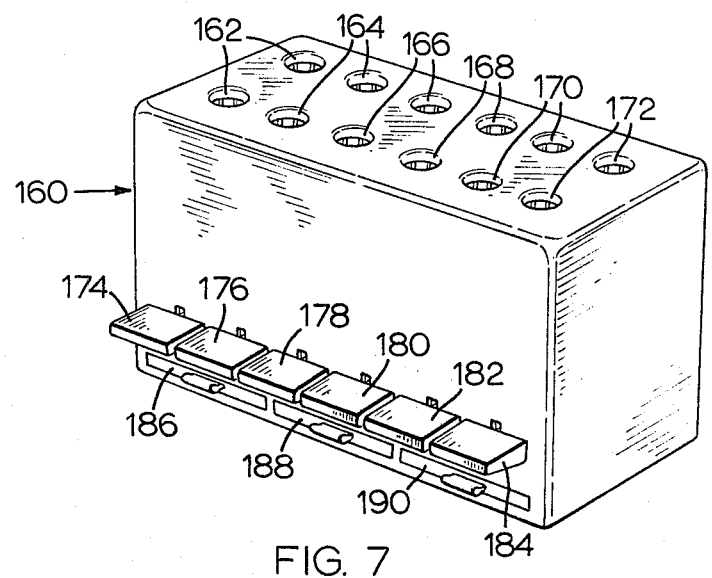

Reference is now made to FIG. 7 which shows a device 160 for heating frankfurters in six groups of two. The device has pairs of openings 162, 164, 166, 168, 170 and 172 in its top for receiving the frankfurters. Each one of the pairs of openings is associated with a separate timer and elevator (not shown) which is coupled to a corresponding one of six control levers 174, 176, 178, 180, 182 and 184. Three trays 186, 188, 190 are provided for collecting grease and the like from the frankfurters during heating.

The device 160 is intended for institutional use in restaurants and the like where a purchaser will often buy two frankfurters. If required, the device can have any number of pairs of openings, and if preferred, the openings can be arranged so that each control lever is associated with only one of the openings.

Figure 8:
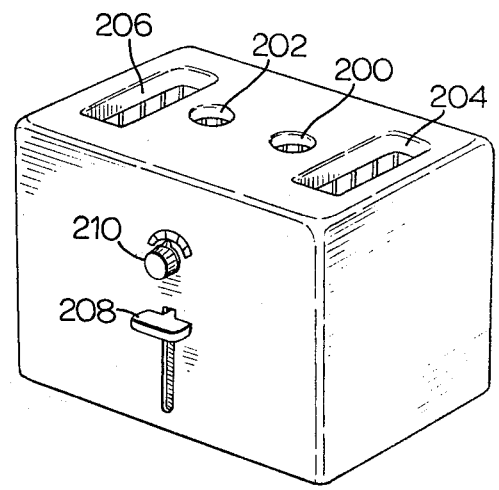
FIGS. 7 and 8 are perspective views of further embodiments of the invention.

FIG. 8 shows an alternative arrangement in which frameworks 200, 202 for the frankfurters and apertures 204, 206 for the buns are all positioned serially along the length of the device. In addition, the apertures 204, 206 are made very short (sufficient to accommodate an opened frankfurter bun) and will not accommodate bread. The drip tray for the FIG. 8 device is at the rear and is therefore not shown in the drawing. The ejector control lever is indicated at 208, and the device includes a thermostatically controlled timer having a control 210. The control 210 can be set between light and well done for the frankfurters, and the timer to which it is attached will trigger the ejector mechanism in conventional manner when the heat builds up to a predetermined level for a present length of time.

By way of numerical illustration, most frankfurters are between ¾ and ⅞ inch diameter, and in that case, the upright rods of each framework should not normally be spaced more than five-eighths inch apart (measured from the surface of the rod to the opposed surface of the next rod) and preferably will be spaced apart by no more than about one-half inch. For a frankfurter of between ¾ and 162 inch diameter, the diameter of the framework opening will typically be 1 ¼ inches, and for such an opening, normally eight upright rods will be used (as shown in FIG. 1), providing a spacing between rods of just slightly under one-half inch center to center and slightly less than this between the surfaces of adjacent rods. In general, where upright rods are used for the framework, the spacing between these rods should be smaller than the frankfurter diameter by a sufficient margin that the frankfurter cannot project appreciably through the rods and jam while moving up and down.

What is claimed as my invention is:

1. A device for heating frankfurters of the kind having a diameter of between three-fourths and seven-eighths inches, said device comprising:
   a. a chassis;
   b. means coupled to the chassis for locating a frankfurter in a selected orientation and restricting curling of the frankfurter during heating, the locating means permitting movement of the frankfurter towards and away from the chassis;
   c. ejector means having a plate for supporting one end of said frankfurter, and means connected to said plate and operable to reciprocate said plate between a first position and a second position so that upon moving the ejector means from the first to the second position the frankfurter is moved away from the chassis, said plate having a protruding rim extending therearound to limit side to side movement of said end of said frankfurter during reciprocation of said ejector means;
   d. at least one heating element attached to the chassis for heating the frankfurter;
   e. control means coupled mechanically to the ejector means and electrically to the heating element, the control means being operable to energize the heating element and to move the ejector means between said first and second positions,
   f. said means (b) comprising a cylindrical framework having a plurality of small diameter rods of circular cross section extending parallel to the axis of said framework, and a plurality of transversely oriented circular hoops attached to said rods with said rods located inside said hoops, said hoops being spaced apart along said rods and having an interior diameter of substantially 1 ¼ inches, said rods having a center to center spacing of substantially one-half inch.

2. A device as claimed in claim 1 wherein said locating means is oriented to locate said frankfurter in a vertical position, said device including further locating means for locating a bun in a vertical orientation with the face of said bun spaced from and facing said frankfurter, said ejector means including a support member for said bun, means supporting said support member for up and down reciprocating movement for raising and lowering said bun, said ejector means including a handle, and means coupling said handle to said plate and to said support member for movement of said handle to raise and lower said plate and said support member simultaneously, said heating element being located between said frankfurter and said bun and having a first number of windings on its side facing said frankfurter and a second number of windings on its side facing said bun, said first number of windings being greater than said second number of windings so that said frankfurter receives more heat than said bun.

* * * * *